United States Patent
Falzon et al.

(10) Patent No.: US 7,460,239 B2
(45) Date of Patent: Dec. 2, 2008

(54) VARIABLE RESOLUTION AND/OR FIELD OF VIEW USING OPTICAL APERTURE SYNTHESIS REMOTE SENSING INSTRUMENT

(75) Inventors: Frédéric Falzon, Pegomas (FR); Eric Thomas, Mandelieu (FR)

(73) Assignee: Thales, Neuilly-sur-Seine (FR)

( * ) Notice: Subject to any disclaimer, the term of this patent is extended or adjusted under 35 U.S.C. 154(b) by 291 days.

(21) Appl. No.: 11/213,725

(22) Filed: Aug. 30, 2005

(65) Prior Publication Data
US 2006/0060763 A1 Mar. 23, 2006

(30) Foreign Application Priority Data
Aug. 31, 2004 (FR) ................................. 04 51939

(51) Int. Cl.
*G01B 9/02* (2006.01)
(52) U.S. Cl. ........................ 356/450; 359/419
(58) Field of Classification Search ............... 356/478; 359/399–431; 342/25 R–25 F
See application file for complete search history.

(56) References Cited

U.S. PATENT DOCUMENTS

| | | | | |
|---|---|---|---|---|
| 4,856,884 A | * | 8/1989 | Fender et al. ............... | 359/419 |
| 5,208,654 A | * | 5/1993 | Shao et al. ................... | 356/498 |
| 6,134,015 A | * | 10/2000 | Hall ............................ | 356/478 |
| 2002/0050942 A1 | * | 5/2002 | Grisham ...................... | 342/25 |
| 2005/0275940 A1 | * | 12/2005 | Chen et al. ................... | 359/399 |

OTHER PUBLICATIONS

Glindenmann A. et al: "The VLT Interferomerter: a unique instrument for high-resolution astronomy: Internet Article, "Online! Mar. 2000, XP002324455.
Lopez B. et al: "APreS-Midi, APertutre Synthesis in the MID-infrared with the VLTI," Proceedings of SPIE, Interferometry for Optical Astronomy II, vol. 4838, Feb. 2003, pp. 1011-1017, XP002324456.
Unwin S. C. et al: "The Space Interferometry Mission" Proceedings of SPIE, Interferometry for Optical Astronomy, vol. 4006, Jul. 2000, pp. 754-761, XP002324457.

* cited by examiner

*Primary Examiner*—Tarifur R Chowdhury
*Assistant Examiner*—Jonathon D Cook
(74) *Attorney, Agent, or Firm*—Sughrue Mion, PLLC

(57) ABSTRACT

A remote sensing instrument using optical aperture synthesis comprises at least two independent remote sensing devices each comprising at least two light collecting means delivering light beams and having a selected field of view and a selected resolution and further comprising recombination means adapted to recombine interferometrically the light beams delivered by said devices so as to deliver a final light beam associated with a resolution better than or equivalent to the lowest resolution of said devices and/or a field of view less than or equal to the largest field of view of said devices.

15 Claims, 2 Drawing Sheets

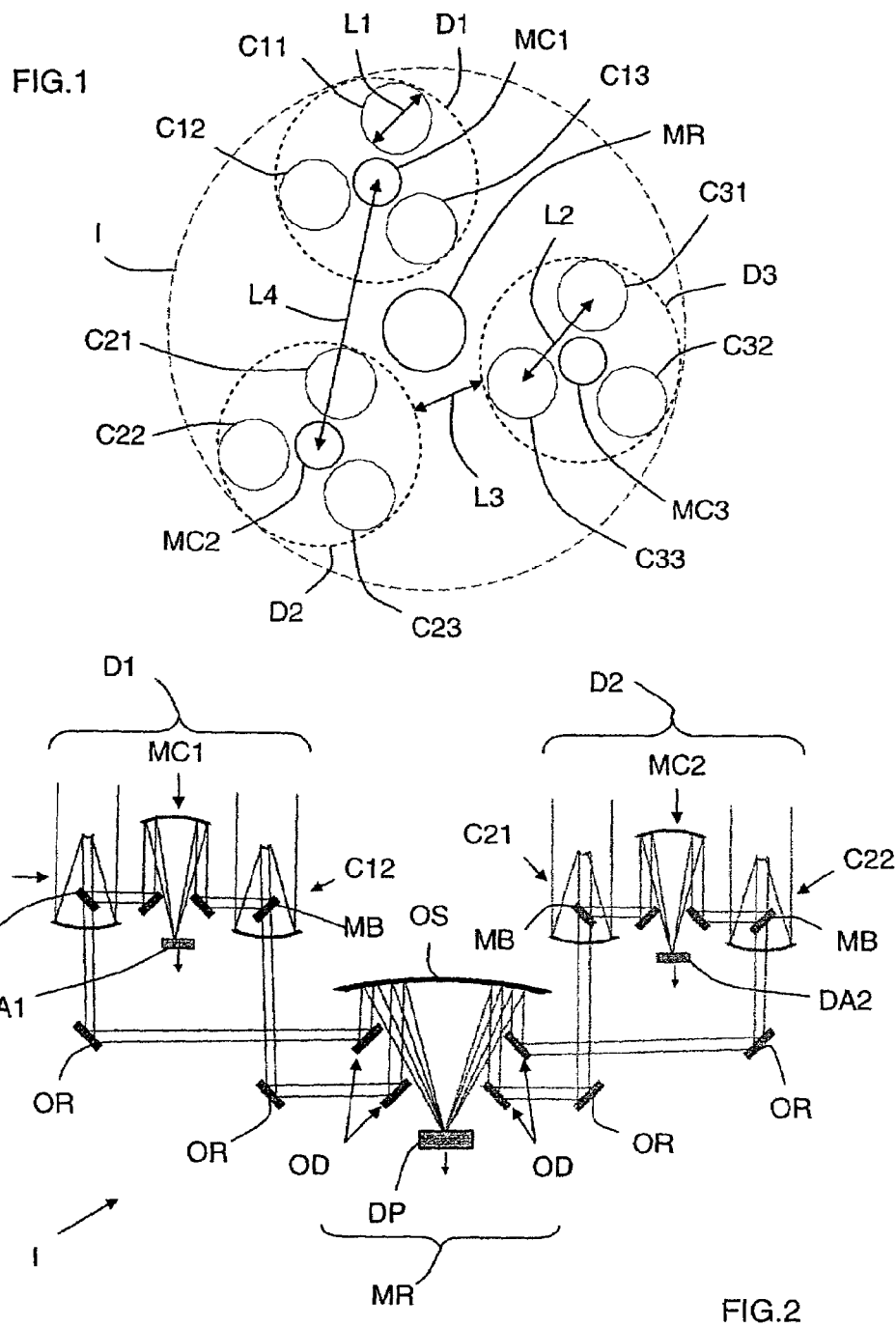

VARIABLE RESOLUTION AND/OR FIELD OF VIEW USING OPTICAL APERTURE SYNTHESIS REMOTE SENSING INSTRUMENT

CROSS-REFERENCE TO RELATED APPLICATIONS

This application is based on French Patent Application No. 04 51 939 filed Aug. 31, 2004, the disclosure of which is hereby incorporated by reference thereto in its entirety, and the priority of which is hereby claimed under 35 U.S.C. §119.

BACKGROUND OF THE INVENTION

1. Field of the invention

The field of the invention is that of remote sensing instruments using optical aperture synthesis and in particular those embarked on satellites.

2. Description of the prior art

The person skilled in the art knows that remote sensing of extended scenes (or sources), such as the Earth or a portion thereof, for example, at high resolution from space, and in particular from high orbits, necessitates telescopes of large diameter, typically greater than ten meters for a resolution of one meter from geosynchronous orbit. The difficulty of producing mirrors and their weight increase with their diameter. Also, because the capacity of launch vehicles (determined in particular by the volume of their nose-cap) naturally limits the size of the onboard instrumentation, it is difficult to envisage the construction of large remote sensing instruments using monolithic mirrors.

To solve the above problems, it has been proposed to produce remote sensing instruments using optical aperture synthesis, which consist of at least two light collecting means, such as "small" mirrors, for example, which are generally plane, or portions of a "large" mirror, or telescopes, for directing light beams that they collect coming from the observed scene to an interferometer type beam combination optic delivering a remote sensing beam to a detector.

The benefit of the above type of instrument, over and above the fact that it can be embarked, lies in the fact that its detector can deliver images whose resolution is better (and which therefore offers more detail) than could be achieved by each light collection means on its own and compared to that which a monolithic mirror of large diameter could produce.

The collection means, which form the pupil of the remote sensing instrument, must of course be disposed with a particular geometry defined by frequency plan energetic filling rules. This therefore imposes compliance with constraints such as an isotropic (or quasi-isotropic) optical transfer function (OTF), absence of areas of cancellation in the OTF, and minimum redundancy of the observed frequencies.

However, when the instrument is embarked, to perform a selected remote sensing mission, other important parameters must also be taken into account.

A parameter such as the field of view of the instrument is strongly dependent on the types of light collecting means and recombination means employed. The field of view may in particular prove to be smaller than that offered by a conventional instrument (including a large monolithic mirror). This is the case in particular if the light collecting means and the recombination means define a Michelson interferometer, because of aberrations introduced by the many optical components and by virtue of the recombination principle.

The overall size is another important parameter to be taken into account. Using light collecting means and recombination means defining a Fizeau interferometer produces a field of view comparable to that of a conventional instrument but leads to a large overall size.

The number of light collecting means used is another important parameter. The probability of failure is a function of the complexity of the remote sensing instrument and therefore of the number of light collecting means.

No prior art remote sensing instrument proving entirely satisfactory, an object of the invention is therefore to improve on this situation.

SUMMARY OF THE INVENTION

To this end it proposes a remote sensing instrument using optical aperture synthesis and comprising at least two independent remote sensing devices each comprising at least two light collecting means delivering light beams and having a selected field of view and a selected resolution and further comprising recombination means adapted to recombine interferometrically the light beams delivered by said devices so as to deliver a final light beam associated with a resolution better than or equivalent to the lowest resolution of said devices and/or a field of view less than or equal to the largest field of view of said devices.

In the present context, the expression "better resolution" means a lower resolution, i.e. a resolution enabling smaller elements to be distinguished.

The instrument of the invention may have other features and in particular, separately or in combination:

a main detector placed substantially in a focal plane of said final beam.

at least three devices, each device may comprise at least three light collecting means, each light collecting means may be a mirror, a portion of a mirror or a telescope, each remote sensing device may have its own focal plane and may comprise recombination means adapted to combine interferometrically at least a portion of the light beams delivered by its light collecting means so as to deliver at least one remote sensing light beam, each device may comprise an auxiliary detector for collecting said portion of the beams recombined interferometrically by said recombination means so as to deliver an image, each device may comprise interception means for sampling at least a portion of the beams delivered by each of its light collecting means so as to orient said sampled portion toward its recombination means. In this case, the interception means comprise, for example, respective sampling mirrors in each of said light collecting means. Each of said mirrors may instead be attached to displacement means adapted to assume at least a first position in which they enable the associated mirror to sample the whole of the beam delivered by the corresponding light collecting means and a second position in which they enable the associated mirror to allow the beam delivered by the corresponding light collecting means to pass so that it can be recombined by said recombination means.

each device may instead comprise interception means for sampling at least a portion of the remote sensing beams delivered by said recombination means so as to orient them toward said auxiliary detector, the interception means comprise, for example, a splitter plate placed at a selected location on the path of the remote sensing light beams. The plate may instead be replaced by a mirror attached to displacement means adapted to assume at least a first position in which they enable said mirror to sample the whole of the beams delivered by said recombination means and a second position in which they enable said mirror to allow the beams delivered by said recombination means to pass so that they may be recombined by said recombination means.

The invention is particularly suitable, although not exclusively so, for remote sensing of extended scenes by means of satellites flying in formation carrying the various component parts of a remote sensing instrument of the type described above. However, the invention is equally suitable for a connected architecture in which the various components are linked by a rigid or deployable structure.

Other features and advantages of the invention will become apparent on reading the following detailed description and examining the appended drawings.

BRIEF DESCRIPTION OF THE DRAWINGS

FIG. 1 is a diagram of one example of the configuration of a remote sensing instrument of the invention, including three remote sensing devices each including three light collecting means.

FIG. 2 is a diagram in cross section of a first embodiment of a portion of a remote sensing instrument of the invention in which the devices constitute Michelson interferometers.

DETAILED DESCRIPTION OF THE PREFERRED EMBODIMENTS

The appended drawings constitute part of the description of the invention as well as contributing to the definition of the invention, if necessary.

An object of the invention is to provide remote sensing instruments using optical aperture synthesis with variable field of view and/or resolution.

A remote sensing instrument 1 of the invention using optical aperture synthesis is described first with reference to FIG. 1.

The instrument 1 comprises at least two independent remote sensing devices Di embarked on independent satellites or on a connected structure and beam recombination means MR embarked on another satellite or on the same structure. In the present example, the instrument comprises three remote sensing devices Di (i=1 to 3), but it may comprise more than three such devices or only two devices.

Each remote sensing device Di comprises at least two light collecting means (hereinafter called collectors) Cij delivering light beams representing the scene(s) (or source(s)) that they observe and has a selected field of view COi and a selected resolution Ri. In the present example, each remote sensing device Di comprises three collectors Cij (j=1 to 3), but it may include more than three such collectors or only two collectors. Moreover, the number and the size of the collectors Cij belonging to each remote sensing device Di may vary from one device to another.

It is important to note that the collectors Cij of a remote sensing device Di may be embarked on different satellites.

The recombination means MR are adapted to recombine in the manner of an interferometer light beams delivered by the various remote sensing devices Di in order to deliver a final light beam associated with a resolution R that is better than, or equivalent to, the lowest resolution Ri of the remote sensing devices Di and/or a field of view CO that is less than or equal to the largest field of view COi of the remote sensing devices Di.

Figure 3:
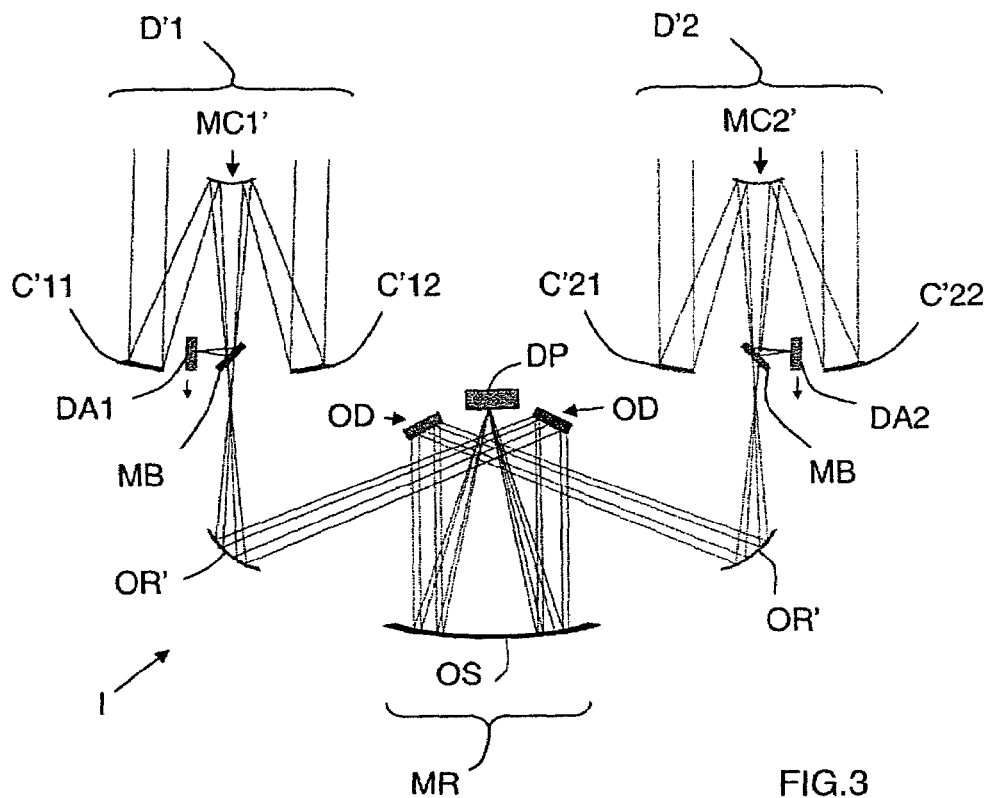
FIG. 3 is a diagram in cross section of a second embodiment of a portion of a remote sensing instrument of the invention in which the devices constitute Fizeau interferometers.

The instrument 1 preferably also includes a main detector DP at the output (or on the downstream side of) its recombination means MR, as shown in FIGS. 2 and 3, to be described further hereinafter, and responsible for deriving images of the scene(s) observed by the various devices Di from the final light beam delivered by said recombination means MR. This main detector DP is preferably installed in the focal plane of the instrument 1.

Each device Di preferably includes recombination means MCi for recombining in the manner of an interferometer light beams delivered by its collectors Cij in order to deliver at least one remote sensing light beam. Accordingly, each device Di constitutes an interferometer having its own focal plane and the instrument 1 of the invention constitutes an interferometric combination of N (sub-)instruments D1 to DN (i=1 to N).

Each device Di preferably includes an auxiliary detector DAi at the output (or on the downstream side of) its recombination means MCi, as shown in FIGS. 2 and 3, for deriving images of the scene observed by the associated collectors Cij from the remote sensing light beam delivered by said recombination means MCi.

If the instrument 1 has a main detector DP and auxiliary detectors DAi, it is able to function in at least three modes.

In a first mode all the devices Di of the instrument 1 function simultaneously and deliver light beams coming from the scene(s) that they observe. In this case, the instrument 1 is the interferometric combination of its various devices ("I=D1+D2+ . . . +DN") and the images that its main detector DP deliver correspond to a resolution R of lower value (i.e. a better resolution) than the resolution Ri of each of the various devices Di.

For example, with three substantially identical devices Di offering a field of view COi and a resolution Ri of about three meters, the instrument 1 has a field of view CO equal to about COi/3 and a resolution R equal to about Ri/3, i.e. about one meter.

In a second mode at least one of the devices Di of the instrument 1 functions and delivers one or more light beams coming from the scene that it observes. In this case, the instrument 1 is equivalent to the only functioning device Di ("I=Di") and the images that it delivers are those supplied by the auxiliary detector DAi of the device Di, which correspond to a resolution Ri of higher value than the resolution R (and therefore a worse resolution) and to a field of view COi greater than the field of view CO.

This second mode may result from an intentional and momentary choice or from a malfunction in at least one of the devices of the instrument 1 or in said instrument 1 (for example a deflector or collector mirror problem). The invention is advantageous in this situation because it enables the instrument 1 to continue to function with a resolution of higher value (i.e. a degraded resolution) in the event of a partial failure.

In a third mode at least two devices Di and Di' of the instrument 1 are functioning (or are being used) simultaneously and deliver light beams coming from substantially identical scenes that they are respectively observing. In this case, the instrument 1 is equivalent to the sum of the devices that are functioning and the images that it delivers are those supplied separately by the auxiliary detectors DAi and DAi' of the devices Di and Di', which respectively correspond to resolutions Ri and Ri' of higher value greater than the resolution R (and therefore a worse resolution) and to fields of view COi and COi' greater than the field of view CO, and/or to the interferometric combination of the devices Di and Di' and the images that its main detector DP delivers correspond to a resolution R' of higher value than the resolution R (and therefore a worse resolution) but of lower value than (and therefore better than) the resolutions Ri and Ri' of each of the various devices Di for a field of view CO' greater than CO.

This third mode may result from an intentional and momentary choice or from a malfunction in at least one of the devices of the instrument 1 or in said instrument 1 (for example a deflector or collector mirror problem). Moreover, this third mode increases the field of view CO' if the devices that are functioning (or are being used) are observing different but contiguous scenes (mosaic effect), and thus the instrument is not functioning in interferometer mode. This third mode also observes N different areas or scenes (or sources) that are not contiguous in parallel (not in interferometer mode). This third mode can deliver simultaneously images of good resolution by means of the main detector DP (close-up or "zoom") and images of lower resolution of a particular area of interest using the auxiliary detector of one of the devices.

Figure 4:
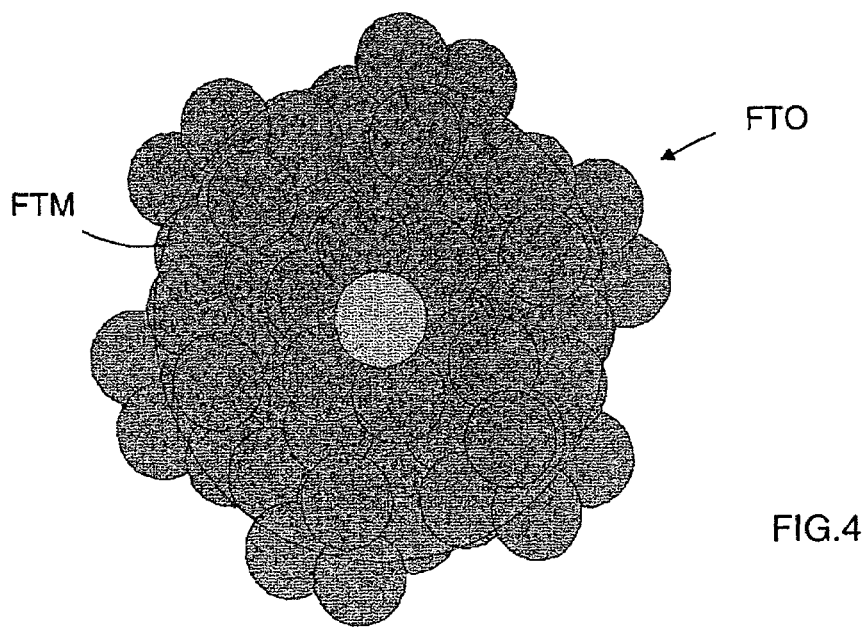
FIG. 4 is a diagram of one example of the OTF of a remote sensing instrument of the invention, the modulation transfer function (MTF) being represented by the dashed line circle, which shows the sampling half-frequency (or Nyquist frequency) that sets the highest frequency observed in a landscape.

The number of remote sensing devices Di selected, the number of collectors Cij selected for each device Di, the type of each collector Cij, the dimensions L1 of the collectors Cij, the distances L2 between collectors Cij, the distances L3 between the "edges" of the devices Di and the distances L4 between the centers of the devices Di are selected so that the instrument 1 has, as shown in FIG. 4, an isotropic (or quasi-isotropic) optical transfer function (OTF) with no cancellation area and minimum observed frequency redundancy.

To be more precise, it is a question here of conjointly optimizing the pupillary configuration of the instrument 1 that has to deliver a high-resolution image and the pupillary configuration of each device (or interferometer) Di placed on one of the interferometric channels of the instrument 1.

The type of device (or interferometer) Di chosen depends mainly on the overall size, the complexity, the resolution R and the field of views CO and COi. The choice might be between Michelson and Fizeau interferometers, for example.

FIG. 2 is a diagram in section of a portion of a remote sensing instrument 1 including devices Di constituting a wide-angle Michelson interferometer. In this example, because of the view in cross section, just two devices D1 and D2 are combined with recombination means MR. However, an instrument may include three or four devices Di, or even more devices. Similarly, because of the view in cross section, in the present example only two collectors (C11, C12, (C21, C22) are seen combined with recombination means MC1, MC2. However, each device Di may include three or four collectors Cij, or even more collectors.

Each Michelson device Di (for example the device D1) comprises at least two collectors C11 and C12 each taking the form of a telescope. Each telescope C11 or C12 collects light from the scene toward which it is pointed and delivers a beam that is to be transmitted to the recombination means MR and/or to the recombination means MC1. For this purpose the telescope C11 or C12 includes a splitter plate or a mirror MB (for example a plane mirror) that can be tilted by displacement means (not shown) between at least a first position in which said mirror MB is able to sample all of the collected beam for it to be recombined by the recombination means MCi with the other collected beam and a second position in which said mirror MB allows the collected beam to pass to that it can be recombined by the recombination means MR with the other collected beam.

The recombination means MC1 combine the beams sampled by the mirrors MB and deliver a remote sensing light beam that is oriented toward the auxiliary detected DA1 for delivering images of low resolution R1 with a field of view CO1. To this end, the recombination means MC1 include a parabolic mirror, for example, although they may be more complex than this.

The portion of the beam collected by a collector C11 or C12 is directed toward the recombination means MR by means of an optic OR such as a plane mirror, for example. The optics OR are embarked on the same satellite or on the same structure as the device D1 or D2.

The recombination means MR include optics OD such as plane mirrors, for example, the number whereof is equal to the number of collectors Cij of the various remote sensing devices Di in order to direct each of these collected beams delivered by the various collectors Cij to a recombination optic OS such as a parabolic mirror, for example. The recombination optic OS recombines the various beams collected by the collectors Cij of the various remote sensing devices Di in order to deliver a final light beam, preferably to the main detector DP installed on its satellite in the focal plane of the remote sensing instrument 1. Supplementary devices for balancing the optical path lengths of each of the arms of the interferometers Di and of the remote sensing instrument 1 may be necessary, but are not shown in FIG. 2.

A portion of a remote sensing instrument 1 including devices Di constituting wide-angle Fizeau interferometers is described next with reference to FIG. 3. In this example, because of the view in cross section, just two devices D'1 and D'2 are combined with recombination means MR. However, the instrument may include three or four devices D'i, or even more devices. Likewise, because of the view in cross section, in this example just two collectors (C'11, C'12), (C'21, C'22) are shown combined with recombination means MC1', MC2'. However, each device D'i may include three or four collectors C'ij, or even more collectors.

Each Fizeau device D'i (for example the device D'1) comprises at least two collectors C'11 and C'12 each taking the form of a convex mirror. Each collector C'11 or C'12 collects light coming from the scene at which it is pointed and delivers a beam that is to be transmitted to the recombination means MC1'.

The recombination means MC1' recombine the beams collected by the collectors C'11 and C'12 in order to deliver remote sensing light beams. To this end, the recombination means MC1' include a concave mirror, for example, or a more complex device. If the remote sensing device D'i includes an auxiliary detector DA1 for delivering images with a low resolution R1 and with a field of view CO1, there is provided on the path of the remote sensing light beam a splitter plate that allows a first portion of the remote sensing light beams to pass to the recombination means MR and the sampling of a complementary second portion of said remote sensing light beams to feed the auxiliary detector DA1, or a plane mirror that can be tilted by displacement means (not shown) between at least a first position in which said mirror MB can sample the whole of the remote sensing light beams so that they may be directed toward the auxiliary detector DA1 and a second position in which said mirror MB allows the remote sensing light beams to pass so that they may be recombined by the recombination means MR with the other remote sensing light beams coming from the other remote sensing devices D'2.

The portion of the remote sensing light beams delivered by a device D'1 is directed toward the recombination means MR by means of an optic OR' such as a parabolic mirror or a more complex device. The optics OR' are embarked on the same satellite or on the same structure as the device D'1 or D'2.

The recombination means MR include optics OD such as plane mirrors or more complex devices, the number whereof is equal to the number of remote sensing devices D'i, for example, in order to direct each of the remote sensing light beams delivered by the recombination means MCi' to a recombination optic OS such as a parabolic mirror or a more complex device. The recombination optic OS recombines the various remote sensing light beams delivered by the recombination means MCi' of the various remote sensing devices D'i in order to deliver a final light beam, preferably to the main detector DP installed on its satellite or on the same structure in the focal plane of the remote sensing instrument 1.

Supplementary devices for balancing the optical path lengths of each of the arms of the interferometers D'i and of the remote sensing instrument 1 may be needed, but they are not shown in FIG. 3.

Thanks to the invention, it is possible to acquire simultaneously high-resolution and low-resolution images providing an instantaneous zoom effect procuring efficacy and flexibility. Moreover, the invention enables simultaneous remote sensing with a wide field of view in different directions, which is particularly advantageous for remote sensing in high orbits (for example geosynchronous orbits). Furthermore, the fact that the invention enlarges the field of view by a direct instrumental mosaic effect is also advantageous because the resulting images do not show significant parallax effects in high orbit. Finally, the invention can rescue a remote sensing mission after the loss of one or more remote sensing devices of the remote sensing instrument 1, which is particularly advantageous in the case of formation flying in particular.

The invention is not limited to the embodiments of a remote sensing instrument described above by way of example only, but encompasses all variants that the person skilled in the art might envisage that fall within the scope of the following claims.

Thus an embodiment of the invention is described hereinabove in which the remote sensing instrument is divided between a plurality of satellites flying in formation. The invention is not limited to that application, however. The remote sensing instrument may be entirely embarked on a single connected (or fixed) or deployable structure, for example a single satellite.

Moreover, the remote sensing instrument of the invention is not exclusively intended for imaging. It may also be used for detection. In this case, the isotropy and minimization of frequency redundancy constraints are less severe.

There is claimed:

1. A remote sensing instrument using optical aperture synthesis and comprising
   at least two independent remote sensing devices each comprising at least two light collecting means delivering light beams and having a selected field of view and a selected resolution,
   first recombination means for recombining interferometrically the light beams delivered by said two independent remote sensing devices and for delivering a final light beam associated with a resolution better than or equivalent to the lowest resolution of said independent remote sensing devices and/or a field of view less than or equal to the largest field of view of said devices and
   a main detector placed substantially in a focal plane of said final beam for delivering an image,
   wherein
   each remote sensing device has its own focal plane and its own second recombination means for combining interferometrically at least a portion of the light beams delivered by its light collecting means, and
   each remote sensing device comprises an auxiliary detector for collecting said portion of the beams recombined interferometrically by its second recombination means and for delivering an auxiliary image.

2. The instrument according to claim 1, wherein each device comprises interception means for sampling at least a portion of the beams delivered by each of its light collecting means so as to orient said sampled portion toward its remote sensing device recombination means.

3. The instrument according to claim 2, wherein said interception means comprise respective sampling mirrors in each of said light collecting means.

4. The instrument according to claim 3, characterized in that said interception means are splitter plates.

5. The instrument according to claim 3, wherein each of said mirrors is attached to displacement means adapted to assume at least a first position in which they enable the associated mirror to sample the whole of the beam delivered by the corresponding light collecting means and a second position in which they enable the associated mirror to allow the beam delivered by the corresponding light collecting means to pass so that it can be recombined by said remote sensing instrument recombination means.

6. The instrument according to claim 1 whereon said second recombination means delivers a remote sensing light beam and wherein each remote sensing device comprises interception means for sampling at least a portion of the remote sensing light beams delivered by said second recombination means so as to orient them toward said auxiliary detector.

7. The instrument according to claim 6, characterized in that said interception means comprise a splitter plate placed at a selected location on the path of the remote sensing light beams.

8. The instrument according to claim 6, characterized in that said interception means comprise a sampling mirror placed at a selected location on the path of the remote sensing light beams.

9. The instrument according to claim 8, wherein said mirror is attached to displacement means adapted to assume at least a first position in which they enable said mirror to sample the whole of the beam delivered by said remote sensing device recombination means and a second position in which they enable said mirror to allow the beam delivered by said remote sensing device recombination means to pass so that it may be recombined by said remote sensing instrument recombination means.

10. The instrument according to claim 1, comprising at least three devices.

11. The instrument according to claim 1, characterized in that each device comprises at least three light collecting means.

12. The instrument according to claim 1, characterized in that each light collecting means is selected from a group comprising at least one mirror, one portion of a mirror and one telescope.

13. The instrument according to claim 1, wherein said devices and said remote sensing instrument recombination means are embarked on different satellites intended to fly in formation.

14. The instrument according to claim 1, characterized in that said devices and said remote sensing instrument recombination means are embarked on a connected structure.

15. The instrument according to claim 1, wherein said devices and said remote sensing instrument recombination means are embarked on a deployable structure.

* * * * *